Jan. 1, 1963    H. U. LIEBERHERR    3,071,122
SUPERCHARGED OPPOSED PISTON ENGINE
Original Filed March 23, 1955
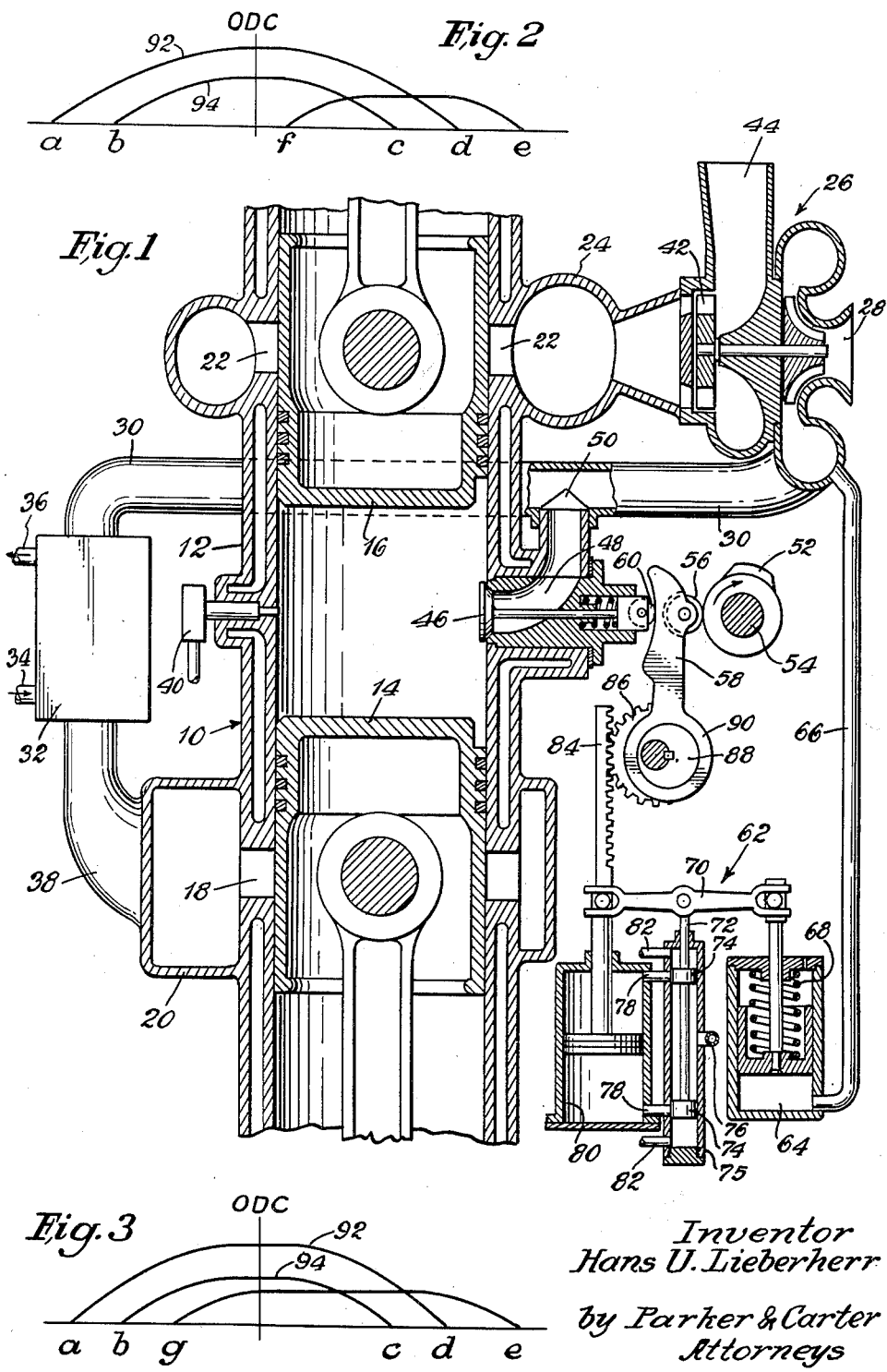
Inventor
Hans U. Lieberherr
by Parker & Carter
Attorneys United States Patent Office 3,071,122
Patented Jan. 1, 1963

3,071,122
SUPERCHARGED OPPOSED PISTON ENGINE
Hans U. Lieberherr, Paris, France, assignor to Nordberg Manufacturing Company, Milwaukee, Wis., a corporation of Wisconsin
Original application Mar. 23, 1955, Ser. No. 496,166, now Patent No. 2,977,943, dated Apr. 4, 1961. Divided and this application May 31, 1960, Ser. No. 33,003
5 Claims. (Cl. 123—51)

This is a division of Serial No. 496,166, filed March 23, 1955, now Patent No. 2,977,943, issued April 4, 1961.

This invention resides in the field of internal combustion engines and is an improved type or form of engine and an improved method of operating an engine.

More specifically, the invention relates to an opposed piston engine, although many of its inventive aspects and features are not necessarily limited to this specific type.

A primary object of my invention is a method of operating an opposed piston engine so as to reject or return a predetermined quantity or amount of air from the cylinders to the inlet side to reduce the volume of air entrapped in the cylinders.

Another object is an opposed piston engine with means for controlling its operation so that it will carry more load without exceeding its maximum safe thermal stresses.

Another object is an opposed piston engine constructed so that the maximum compression pressures can be controlled over a selected load range.

Another object is an opposed piston engine with means for returning a predetermined quantity of air from the cylinder during the compression stroke of the pistons to the inlet manifold or inlet side.

Another object is a supercharged, intercooled, opposed piston engine with a compression control valve in the cylinder or cylinders to provide for the rejection of a predetermined quantity of air from the compression space to a point in the inlet side.

Another object is an opposed piston engine of the above type constructed so that the rejected or returned air from the compression space will again be cooled before it is admitted to the cylinder again.

Another object is a method of operating an opposed piston engine in a selected load range so that the weight of air entrapped for compression will vary in direct relation to the load in the range.

Other objects will appear from time to time in the ensuing specification and drawings in which:

FIGURE 1 is a schematic sectional view of an opposed piston engine illustrating one form of my invention;

FIGURE 2 is an example of a port timing diagram applicable to an engine with my invention; and FIGURE 3 is one alternate timing diagram.

In FIGURE 1, an opposed piston engine is indicated generally at 10 and the usual cylinder 12 with an inlet piston 14 and an exhaust piston 16, the inlet piston controlling suitable inlet ports 18 and the usual inlet manifold 20 and the exhaust piston controlling suitable exhaust ports 22 with the usual exhaust manifold 24. The engine has the usual crankshaft, connecting rods, wrist pins, and the like, all of which are conventional and will not be referred to or illustrated in detail.

Inlet air is supplied to the engine by a supercharger 26 which draws in air through a suitable inlet 28, compresses it, and conveys it, through a suitable connection 30, to an intercooler 32 where at least a part of the heat of compression is withdrawn, the intercooler having suitable cooling water inlet and outlet connections 34 and 36. By a connection 38, of any suitable type, the compressed cooled air may be supplied to the inlet manifold, and when the inlet piston uncovers the inlet ports, it enters the cylinders. Fuel, of any suitable type, is supplied to the cylinders by a fuel admitting mechanism 40 and although I have diagrammatically indicated an injection nozzle for diesel fuel, it should be understood that a suitable gas valve and spark plug could be used, if the engine is a gas engine, or a gas valve and injection nozzle could be present if the engine is a dual fuel engine. Therefore, the injector 40 in FIGURE 1 is merely intended to indicate a fuel admitting means of any suitable type.

After the fuel has been admitted and burned in the cylinder, hot exhaust gases flow out through the exhaust ports 22 when the exhaust piston uncovers them, and an exhaust turbine 42 is connected to the exhaust manifold so that the energy in the hot exhaust gases will be used to drive the inlet air compressor. The exhaust gases can be vented to the atmosphere through any suitable outlet 44.

The cylinder is provided with one or more suitable compression control valves 46 which cover an auxiliary passage 48 communicating with the inlet side at 50. The valve is biased closed by a spring in the usual manner and is opened by a suitably shaped cam 52 on an engine driven shaft 54 through a follower 56 carried by a lever arm 58, the lever arm bearing against a suitable follower 60 on the stem of the control valve. The shaft 54 can be considered as rotating in the direction of the arrow.

The timing of the compression control valve 46 is controlled by a pneumatic mechanism, indicated generally at 62, which includes a cylinder and piston 64 supplied with air from the outlet side of the supercharger by a suitable pipe 66, the piston being biased against the pressure of the air by a suitable spring 68. A lever 70 is connected to the end of the piston rod and carries a control shaft 72 having two control pistons 74 in a control cylinder 75. A source of pressure fluid 76, such as oil from the lubricating oil system, communicates with this cylinder and is controlled by the pistons 74 to admit pressure fluid through the passages 78 into both sides of the piston 80, suitable discharges being indicated at 82 for cylinder 75. The piston 80 carries a rack 84 on its piston rod which meshes with a pinion 86 which positions an eccentric 88 surrounded by a strap 90 on the lever 58.

Thus, the pressure of the air supplied by the supercharger will determine the timing of the compression control valve 46 due to the variable positioning of the follower 56 in response to rotation of the eccentric 88.

In FIGURE 2, I have suggested one timing diagram for the compression control valve. The exhaust port area 22 is indicated at 92 overlying the inlet port area at 94, the exhaust ports being uncovered by the exhaust piston at $a$ ahead of the inlet ports at $b$ and being covered at $d$ after the inlet ports are covered by the inlet piston at $c$. The compression control valve is adapted to close at $e$ after the exhaust ports have closed at $d$ so that from $d$ to $e$ a predetermined quantity of the entrapped volume in the cylinder will be rejected to the inlet line 30. The cam 52 controlling the compression control valve is such as to open the valve at $f$ immediately after the pistons are at outer dead center.

In FIGURE 3, I have suggested another timing diagram in which the reference numerals used to indicate the timing of the inlet and exhaust port areas are the same, the inlet piston area being designated by 94, the exhaust by 92. The compression control valve is again closed at $e$ so that, from $d$ to $e$, a substantial quantity of the air normally entrapped for compression will be rejected to the inlet side; however, the control mechanism for the valve is adapted to open the valve at $g$ a substantial distance ahead of outer dead center. Scavenging air will then flow into the cylinder from $g$ to $d$ and cylinder air will be rejected from $d$ to $c$. By an oblique positioning of the valve in the cylinder wall, a swirl can be introduced which can substantially improve the combustion. Thus, the auxiliary passage 48 additionally aids proper scavenging in the cylinder and combustion.

It should be understood that the point of opening of the auxiliary passage 48 into the cylinder can be suitably positioned in any location to effect the maximum scavenging.

It will be realized that whereas I have described and illustrated a practical and operative device with several other suggestions, nevertheless, many changes may be made in the size, shape, arrangement, number and disposition of parts without departing materially from the spirit of my invention. I wish, therefore, that my showing be taken as in a large sense illustrative or diagrammatic rather than as limiting me to the precise details of my selected forms of illustration.

The use, operation and function of my invention are as follows:

This invention is in the nature of a method of operating an opposed piston engine and an apparatus for carrying out that method so that more load can be carried by a conventional opposed piston engine without exceeding the maximum safe pressure and the maximum thermal stresses.

As the load increases above a certain minimum, air is rejected to the inlet side of the engine. In the specific examples given, at full load, after the exhaust piston has covered the exhaust ports, means is provided for rejecting a predetermined amount of air from the cylinder back to the inlet side.

In FIGURE 1, air is rejected through the control valve 46 to the inlet line between the supercharger and intercooler. A portion of the residual gases may flow through the auxiliary passage back to the inlet side and this hot gas will again be cooled by passage through the intercooler 32.

It should be understood in FIGURE 1 that the auxiliary passage 48 could be connected to the inlet side between the intercooler and the inlet manifold and in this case an auxiliary intercooler could be used to reduce the temperature of the rejected gas. I have found that in both cases the rejected gas may be filtered, and in this case a suitable filter can be provided in the line before the rejected air is returned to the inlet side.

In FIGURE 1, I have illustrated one form of mechanism for varying the timing of the control valve and it should be understood that any suitable mechanism can be used which will time the valve in relation to the load on the engine. If the engine is operating as a diesel engine, it is desirable that the control mechanism employed time the valve in inverse relation to the load so that as the load increases, the timing of the valve will be retarded and vice versa. Thus, at no load a minimum amount of air will be rejected through the control valve and sufficiently high pressures and temperatures will be obtained in the combustion space to ignite the fuel. At full load, the maximum amount of air will be rejected through the control valve and sufficiently high pressures and temperatures will be obtained in the combustion space to ignite the fuel. At full load, the maximum amount of air will be rejected and the temperature rise, due alone to compression in the cylinder, will be at a minimum.

If the engine is a gas engine, the mechanism could be quite different and could be adapted to time the closing of the valve in relation to the load so as to entrap a volume of air which, when combined with a gaseous fuel admitted, would produce a constant air-fuel ratio mixture over the entire load range.

It should be understood that the method and apparatus can function over a selected load range less than from no load to full load and the appended claims should be so interpreted.

I claim:

1. In an opposed piston engine, a cylinder with inlet and exhaust ports in the cylinder wall at opposite ends, exhaust and inlet pistons opposing each other in the cylinder and adapted to open and close the ports, an inlet side including a supercharger and an intercooler for supplying compressed cooled air to the cylinder, and means for rejecting a predetermined amount of air from the cylinder to the inlet side after the exhaust piston has covered the exhaust ports during its compression stroke at least at the higher loads, including at least one compression control valve and port communicating with the inlet side at approximately the mid point of the cylinder, and means for closing the compression control valve after the inlet and exhaust pistons have closed the inlet and exhaust ports to reject air normally entrapped in the cylinder back to the inlet side.

2. The structure of claim 1 characterized by and including means for timing the closing of each compression control valve in relation to the load on the engine.

3. The structure of claim 2 wherein said last mentioned means retards the time of closing of the compression control valve as the load increases and vice versa so that the volume entrapped will decrease as the load increases and vice versa.

4. The structure of claim 2 wherein the engine is a gas engine and said last mentioned means times the closing of each compression control valve so as to entrap a mixture having an approximately constant air-fuel ratio.

5. The structure of claim 1 further characterized in that the compression control valve and port communicate with the inlet side at a point between the supercharger and the intercooler so that the rejected gases from the compression control valve will again be cooled when passing through the intercooler.

References Cited in the file of this patent

UNITED STATES PATENTS

| | | |
|---|---|---|
| 1,330,496 | Ruegg | Feb. 10, 1920 |
| 1,537,128 | Mayer | May 12, 1925 |
| 1,660,610 | Fornaca | Feb. 28, 1928 |
| 2,097,883 | Johansson | Nov. 2, 1937 |
| 2,401,188 | Prince | May 28, 1946 |